United States Patent
Grigg et al.

(10) Patent No.: US 8,744,968 B1
(45) Date of Patent: Jun. 3, 2014

(54) PROVIDING AUTOMATED INITIAL AND FINAL PAYMENT FOR AN ACTIVITY BASED ON DETERMINING THE LOCATION OF AN ACTIVITY PARTICIPANT'S MOBILE COMMUNICATION DEVICE

(71) Applicant: Bank of America Corporation, Charlotte, NC (US)

(72) Inventors: David M. Grigg, Rock Hill, SC (US); Susan Smith Thomas, Gastonia, NC (US); Scott Lee Harkey, Concord, NC (US); Laura Bondesen, Charlotte, NC (US); Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/800,916

(22) Filed: Mar. 13, 2013

(51) Int. Cl.
G06Q 10/00 (2012.01)
G06Q 40/00 (2012.01)

(52) U.S. Cl.
USPC .................. 705/44; 705/1.1; 705/39; 705/41

(58) Field of Classification Search
USPC .............................................. 705/1.1, 39, 41
See application file for complete search history.

(56) References Cited

U.S. PATENT DOCUMENTS

| 5,437,346 | A | 8/1995 | Dumont |
| 7,472,081 | B1 | 12/2008 | Cason |
| 7,988,045 | B2 | 8/2011 | Connell, II et al. |
| 8,270,995 | B1 * | 9/2012 | Manroa et al. ............. 455/456.3 |
| 2006/0030333 | A1 * | 2/2006 | Ward et al. ................. 455/456.1 |
| 2011/0270618 | A1 * | 11/2011 | Banerjee et al. ............... 705/1.1 |
| 2011/0320296 | A1 | 12/2011 | Edwards |
| 2012/0173551 | A1 | 7/2012 | Haddorp et al. |
| 2012/0265585 | A1 * | 10/2012 | Muirbrook et al. ............. 705/13 |
| 2012/0316963 | A1 * | 12/2012 | Moshfeghi ................ 705/14.58 |
| 2013/0030882 | A1 * | 1/2013 | Davis et al. ..................... 705/13 |
| 2013/0030931 | A1 * | 1/2013 | Moshfeghi ...................... 705/16 |
| 2013/0178233 | A1 * | 7/2013 | McCoy et al. ............. 455/456.3 |

OTHER PUBLICATIONS

Tode, Chantal. "*Walmart speeds up checkout, lets shoppers scan items via iPhone.*" Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smatphone-App81027. 2 page. Retrieved Mar. 9, 2013.

(Continued)

*Primary Examiner* — William Rankins
(74) *Attorney, Agent, or Firm* — Michael A. Springs; Moore & Van Allen PLLC; James C. Edwards

(57) ABSTRACT

Systems, methods and computer programs provide for automated initial and final payment for an activity based on determining the location of an activity participant's mobile communication device. The described embodiments provide for the activity participant to automatically pay for the activity based on their presence at the activity location and agreement to participate. As such, the need to check-in and/or pay for the activity at a conventional payment counter is eliminated. Further, the invention provides for an automatic final payment to be made at the conclusion of the activity as opposed to having to pre-pay for the activity prior to conducting the activity. By remitting final payment at the completion of the activity, activity pricing can be accurately determined based on the amount and/or time of the activity in which the activity participant participated.

25 Claims, 4 Drawing Sheets

(56) References Cited

OTHER PUBLICATIONS

QThru.com. "*QThru: use your mobile smartphone for self-checkout.*" http://www.qthru.com/. QThru.com © 2011. 6 pages. Retrieved Mar. 22, 2013.

Zimmerman, Ann. "Check Out the Future of Shopping: Shaving Time Off the Weekly Grocery Run To Keep Consumers in Stores and Spending." http://online.wsj.com.article/SB10001424052748703421204576329253050637400.html. 5 pages. Retrieved Mar. 22, 2013.

\* cited by examiner

PROVIDING AUTOMATED INITIAL AND FINAL PAYMENT FOR AN ACTIVITY BASED ON DETERMINING THE LOCATION OF AN ACTIVITY PARTICIPANT'S MOBILE COMMUNICATION DEVICE

FIELD OF THE INVENTION

In general, embodiments herein disclosed relate to commerce and, more specifically providing automated payment for an activity based on determining location of the activity participant's mobile communication device.

BACKGROUND

Both activity providers and activity participants desire efficient and accurate means for paying for activities. For example, golfers usually must pay in advance at a clubhouse for a round of golf. However, in this scenario the golfer may be subjected to a long line at the clubhouse counter prior to paying for their round of golf. In addition, paying in advance is somewhat problematic if the golfer ultimately decides while playing that they would prefer to less than a full round (e.g., nine holes as opposed to eighteen holes) or more than one round (e.g., thirty-six holes as opposed to eighteen holes). Since the golfer pays in advance, if he or she decides to play less than a full round they are being overcharged for the activity provided. In the event they choose to play more than one round the golfer either needs to pay again at the clubhouse (a time-consuming endeavor) or forego paying again at the expense of the golf course.

Other activities which are charged on a time-rate basis, such as an hourly rate or the like, may not provide the activity participant many options if they desire to participant in an activity for less time than the time-rate allows (e.g., participate for 45 minutes while being charged for a full hour) or participant for portions of time periods (e.g., participate for 1.25 hours while being charged for a full two hours). In the event that the activity provider does provide for charging participants based on prorated time periods, difficulty may exist in accurately tracking the time of the participants, especially during periods of high activity. Such time-rate charging for activities often results in disputes between the activity provider and the participant over how the exact amount of time participated. While the participant may have enjoyed the activity if they ultimately believe that they were charged an excessive rate for the activity, they are unlikely to return and participant in the activity again.

Therefore, a need exists to create new ways for activity providers to allow activity participants to pay for activities. The desired systems and methodologies should allow for automated payment that circumvents the need for the activity participant to wait in line to make payment. In addition, the desired systems and methodologies should eliminate the need to pay for the entire activity in advance and should provide for an accurate and automated assessment of how much of the activity the participant participated in so that the participant is ultimately charged accurately for the activity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for automated initial and final payment for an activity based on determining the location of an activity participant's mobile communication device. The described embodiments provide for the activity participant to automatically pay for the activity based on their presence at the activity location and agreement to participate. As such, the need to check-in and/or pay for the activity at a conventional payment counter is eliminated. Further, the invention provides for an automatic final payment to be made at the conclusion of the activity as opposed to having to pre-pay for the activity prior to conducting the activity. By remitting final payment at the completion of the activity, activity pricing can be accurately determined based on the amount and/or time of the activity in which the activity participant participated.

In this regard embodiments of the present invention provide for a mobile communication device, equipped with location-determining mechanisms, such as a Global Positioning System (GPS) device, to recognize that the device is located at an activity-providing location (i.e., the check-in point or payment point for participating in an activity). Such location recognition prompts the mobile communication device to generate an alert asking the participant if they desire to participate in the activity. If an affirmative response is received to the query, the activity participant/participant is asked to submit an initial payment, which may be a down payment or authorization to subsequently charge an account the full payment. The mobile device further recognizes when the activity participant departs a predetermined designated activity area (i.e., the golf course, playing facility/field, or the like) and, once departed, automatically remits a final payment for the activity, such that the initial payment in combination with the final payment result in payment in full for the activity.

In specific embodiments of the invention, the mobile communication device is able to calculate the amount due for the activity in the event participation in the activity is charged on a time-based rate. In such embodiments of the invention, the mobile communication device identifies the start time as the time the device entered into the predetermined designated activity area and the stop time as the time the device exits the predetermined designated activity area. Thus, based on a known predetermined activity rate (e.g., x dollars/hour), the amount due can be automatically determined and remitted to the activity participant's payment account. In other specific embodiments of the invention, the mobile device is able to calculate the amount due for the activity in the event participation in the activity is charged on a level-completed basis (e.g., charged based on the number of golf holes completed or the like). In such embodiments of the invention, the mobile communication device recognizes the location at which the activity participant departed from the predetermined designated activity area and, the departure location (and in some embodiments the time of the departure) is evident of how much of the activity the participant completed (e.g., which hole on a golf course the participant finished up on).

An apparatus for a participant to pay for participation in an activity provided by an activity provider defines first embodiments of the invention. The apparatus comprises a mobile communication device including a computing platform having a processor, a memory in communication with the processor and a location-determining device in communication with the processor. The apparatus further includes an activity payment application stored in the memory, executable by the processor and configured to implement the location-determining device to determine a present location and identify the present location as an activity site at which the participant may conduct an activity requiring payment and, in response to identifying the present location as the activity site, generate and communicate, to a user interface on the mobile communication device, a first alert that is configured to query the participant to participate in the activity offered at the activity site. The activity payment application is further configured to, in response to the participant agreeing to participate in the activity, request that the participant submit an initial payment and receive a participant-input that authorizes payment of the initial payment using a participant-designated payment account, wherein receipt of the initial payment by the activity provider authorizes the participant to participate in the activity. The activity payment application is further configured to implement the location-determining device to determine that the participant departed a predetermined area in which the activity occurs, and, in response to determining that the participant has departed the predetermined area, automatically remit, from the payment account to the activity provider, a final payment for the activity.

In specific embodiments of the apparatus, the activity payment application is further configured to determine a first time at which the participant initiates the activity and a second time at which the participant finishes the activity, wherein the first and second times are determined based on the participant entering the predetermined area at the first time and departing the predetermined area at the second time. In such embodiments of the apparatus, the activity payment application is further configured to determine an amount for the final payment, wherein the amount is determined based on the first and second times and a predetermined time-based activity rate.

In further specific embodiments of the apparatus, the activity payment application is further configured to determine a departure location at which the participant departed the predetermined area, wherein the departure location indicates a level of the activity that the participant completed. In such embodiments of the apparatus, the activity payment application is further configured to determine an amount for the final payment, wherein the amount is determined based on the level of the activity that the participant completed and a level-completed-based activity rate.

In other specific embodiments of the apparatus, the activity payment application is further configured to, in response to automatically remitting the final payment, generate and communicate, to the participant, a payment receipt that includes an amount paid for the activity.

In still further specific embodiments of the apparatus, the activity payment application is further configured to implement the location determining device to determine that the participant is located within the predetermined area and, in response to determining that the participant is located within the predetermined area, generate and communicate one or more second alerts, wherein the second alert includes a current payment amount for the activity. In such embodiments of the apparatus, the activity payment application may be further configured to determine the current payment amount based on a first time at which the participant initiated the activity, the current time and a predetermined time-based activity rate. While in other embodiments of the apparatus, the activity payment application may be further configured to implement the location-determining device to determine a current location of the mobile communication device, wherein the current location indicates a level of the activity that the participant has currently completed and determine the current payment amount based on the level of the activity that the participant has currently completed and a level-completed-based activity rate.

A method for a participant to pay for participation in an activity provided by an activity provider defines second embodiments of the invention. The method includes determining, by a mobile communication device, a present location as an activity site at which the participant, in possession of the mobile communication device, may conduct an activity requiring payment. The method further includes, in response to determining the present location as the activity site, generating and communicating, to a user interface on the mobile communication device, a first alert that is configured to query the participant to participate in the activity offered at the activity site and, in response to the participant agreeing to participate in the activity, request that the participant submit an initial payment. In addition the method includes receiving, by the mobile communication device, a participant-input that authorizes payment of the initial payment using a participant-designated payment account, wherein receipt of the initial payment by the activity provider authorizes the participant to participate in the activity. Additionally, the method includes determining, by the mobile communication device, that the participant, in possession of the mobile communication device, has departed a predetermined area in which the activity occurs and, in response to determining that the participant has departed the predetermined area, automatically remitting, from the payment account to the activity provider, a final payment for the activity.

In specific embodiments of the method, determining that the participant has departed the predetermined area further includes determining, by a computing device, a first time at which the participant initiates the activity and a second time at which the participant finishes the activity, wherein the first and second times are determined based on the participant, in possession of the mobile communication device, entering the predetermined area at the first time and departing the predetermined area at the second time. In such embodiments the method may further include determining, by a computing device, an amount for the final payment, wherein the amount is determined based on the first and second times and a predetermined time-based activity rate.

In still further embodiments of the method, determining that the participant has departed the predetermined area further includes determining, by a computing device, a departure location at which the participant departed the predetermined area, wherein the departure location indicates a level of the activity that the participant completed. In such embodiments the method may further include determining an amount for the final payment, wherein the amount is determined based on the level of the activity that the participant completed and a level-completed-based activity rate.

In other specific embodiments the method includes, in response to automatically remitting the final payment, generating and communicating, to the participant, a payment receipt that includes an amount paid for the activity.

In further specific embodiments the method includes generating and communicating, to the mobile communication device, one or more second alerts while the participant, in possession of the mobile communication device, is located within the predetermined area, wherein the second alert includes a current payment amount for the activity. In such embodiments the method may further include determining, by a computing device, the current payment amount based on a first time at which the participant initiated the activity, the current time and predetermined time-based activity rate. While in other such embodiments the method may include determining, by a computing device, the current payment amount based on a current location of the participant, in possession of the mobile communication device, and a level-completed-based activity rate, wherein the current location indicates the level of the activity that the participant has currently completed.

A computer program product including a non-transitory computer-readable medium having computer-executable instructions defines third embodiments of the invention. The computer-executable instructions cause a computer to implement the steps of determining a present location as an activity site at which a participant may conduct an activity requiring payment and, in response to determining the present location as the activity site, generating and communicating a first alert that is configured to query the participant to participate in the activity offered at the activity site. Further, the computer-executable instructions cause the computer to implement the steps of, in response to the participant agreeing to participate in the activity, requesting that the participant submit an initial payment, wherein the initial payment is less than a full payment required for the activity and receiving a participant-input that authorizes payment of the initial payment using a participant-designated payment account, wherein receipt of the initial payment by an activity provider authorizes the participant to participate in the activity. In addition, the computer-executable instructions cause the computer to implement the steps of determining that the participant has departed a predetermined area in which the activity occurs and, in response to determining that the participant has departed the predetermined area, automatically remitting a final payment for the activity.

Thus, systems, apparatus, methods and computer products are described in more detail below that provide for automated initial and final payment for an activity based on determining the location of an activity participant's mobile communication device. The described embodiments provide for the activity participant to automatically pay for the activity based on their presence at the activity location and agreement to participate. As such, the need to check-in and/or pay for the activity at a conventional payment counter is eliminated. Further, the invention provides for an automatic final payment to be made at the conclusion of the activity as opposed to having to pre-pay for the activity prior to conducting the activity. By remitting final payment at the completion of the activity, activity pricing can be accurately determined based on the amount and/or time of the activity in which the activity participant participated.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
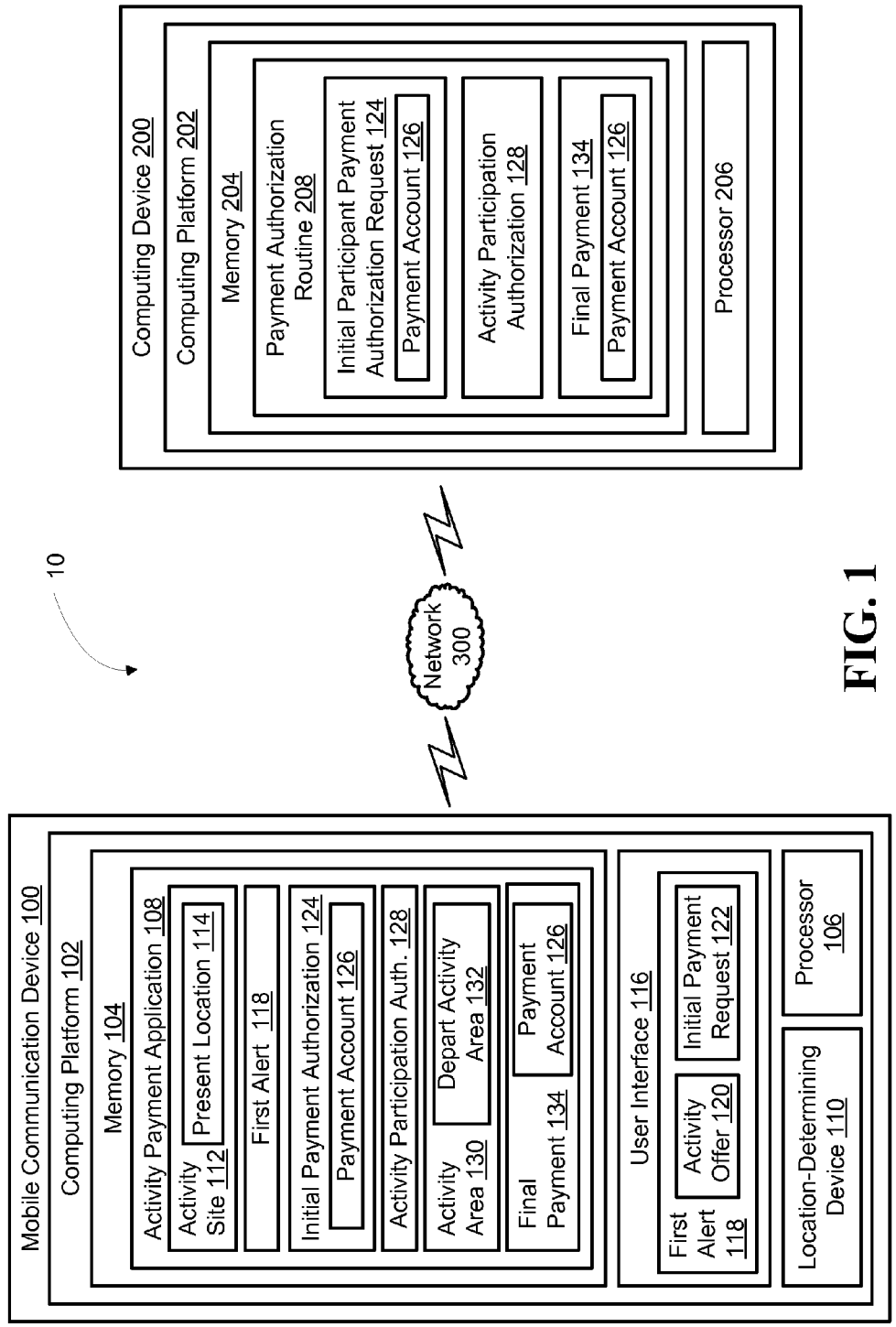
Figure 2:
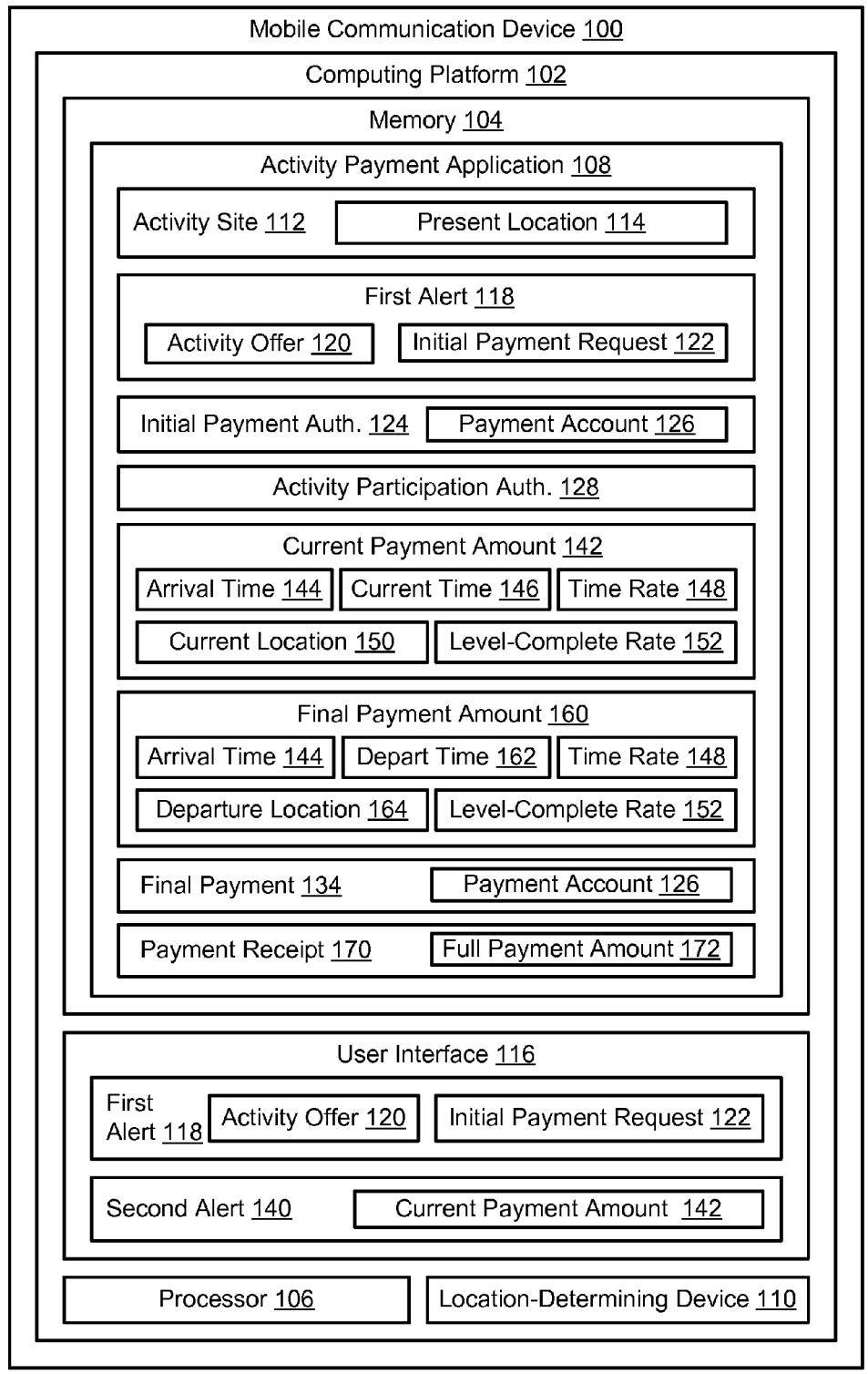
Figure 3:
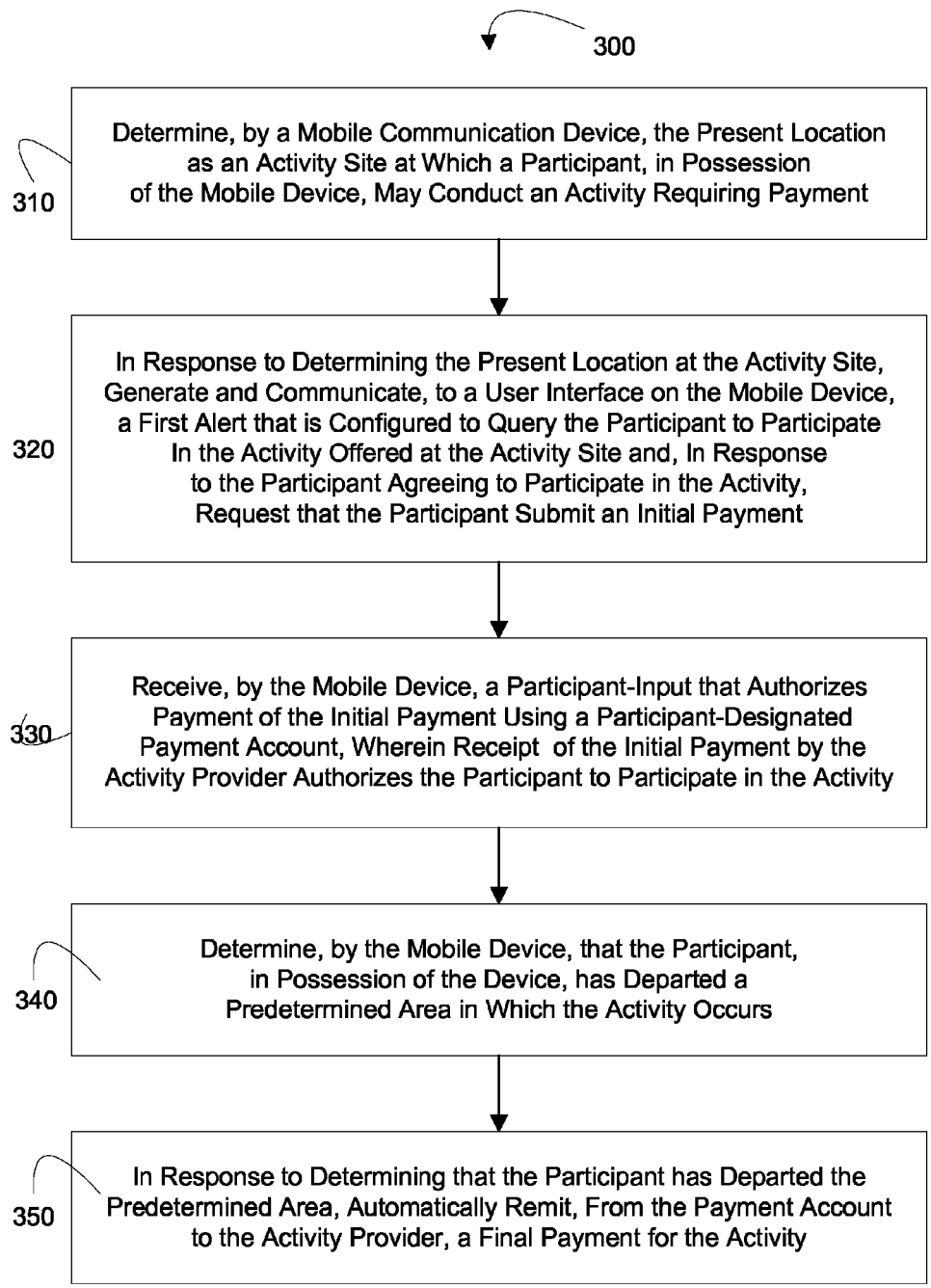
Figure 4:
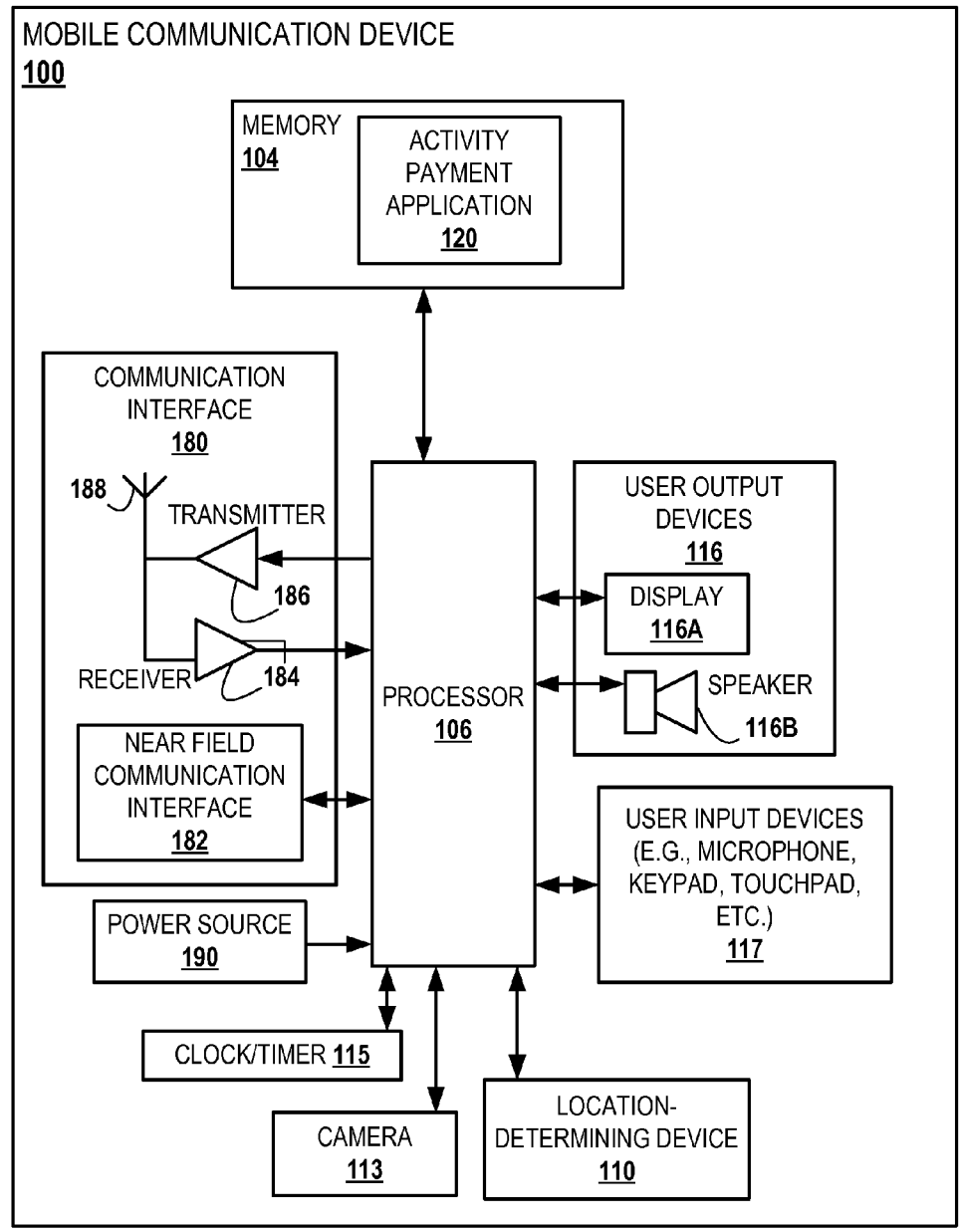

Having thus described embodiments of the invention in general terms, reference will now be made to the accompanying drawings, which are not necessarily drawn to scale, and wherein:

FIG. 1 is a block diagram illustrating a system for providing automated payment for an activity based on determining location of the activity participant's mobile communication device, in accordance with an embodiment of the invention;

FIG. 2 is a block diagram illustrating a mobile communication device for providing automated payment for an activity based on determining location of the device, in accordance with an embodiment of the invention;

FIG. 3 is a flow diagram illustrating a method for providing automated payment for an activity based on determining location of the activity participant's mobile communication device, in accordance with an embodiment of the invention; and FIG. 4 is a more detailed block diagram illustrating a mobile communication device used to provide automated payment for an activity based on determining location of the device, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Methods, apparatus systems and computer program products are described herein that provide for provide for automated initial and final payment for an activity based on determining the location of an activity participant's mobile communication device. The described embodiments provide for the activity participant to automatically pay for the activity based on their presence at the activity location and agreement to participate. As such, the need to check-in and/or pay for the activity at a conventional payment counter is eliminated. Further, the invention provides for an automatic final payment to be made at the conclusion of the activity as opposed to having to pre-pay for the activity prior to conducting the activity. By remitting final payment at the completion of the activity, activity pricing can be accurately determined based on the amount and/or time of the activity in which the activity participant participated.

In this regard embodiments of the present invention provide for a mobile communication device, equipped with location-determining mechanisms, such as a Global Positioning System (GPS) device, to recognize that the device is located at an activity-providing location (i.e., the check-in point or payment point for participating in an activity). The activity-providing location or activity check-in point is geo-fenced for the purpose of the mobile communication device being able to recognize that it is present at an activity-providing location. Geo-fencing, which is well known in the art, is a virtual perimeter around an actual geographic area. Geo-fencing allows a device, equipped with location-determining means to recognize its presence in the geo-fenced region and to receive notifications/alerts signifying the device's presence in the area/region. In the present invention, such location recognition prompts the mobile communication device to generate an alert asking the participant if they desire to participate in the activity. If an affirmative response is received to the query, the activity participant/participant is asked to submit an initial payment, which may be a down payment or authorization to subsequently charge an account the full payment. The mobile device further recognizes when the activity participant departs a predetermined designated activity area (i.e., the golf course, playing facility/field, or the like) and, once departed, automatically remits a final payment for the activity, such that the initial payment in combination with the final payment result in payment in full for the activity.

In specific embodiments of the invention, the mobile communication device is able to calculate the amount due for the activity in the event participation in the activity is charged on a time-based rate. In such embodiments of the invention, the mobile communication device identifies the start time as the time the device entered into the predetermined designated activity area and the stop time as the time the device exits the predetermined designated activity area. Thus, based on a known predetermined activity rate (e.g., x dollars/hour), the amount due can be automatically determined and remitted to the activity participant's payment account. In other specific embodiments of the invention, the mobile device is able to calculate the amount due for the activity in the event participation in the activity is charged on a level-completed basis (e.g., charged based on the number of golf holes completed or the like). In such embodiments of the invention, the mobile communication device recognizes the location at which the activity participant departed from the predetermined designated activity area and, the departure location (and in some embodiments the time of the departure) is evident of how much of the activity the participant completed (e.g., which hole on a golf course the participant finished up on).

FIG. 1 illustrates a block diagram of a system 10 for providing automated payment for an activity based on determining location of the activity participant's mobile communication device, in accordance with specific embodiments of the present invention. The system 10 includes a mobile communication device 100 that is in the possession of a user, referred to herein as the participant. The mobile communication device 100 will typically be a smart cellular telephone, however, in other embodiments the mobile communication device may be a personal digital assistant (PDA), a mobile Internet accessing device, a laptop/portable computer, or other mobile communication device capable of executing applications and communicating via a wireless network 300, which may be a cellular network, and/or a data network, such as the Internet or the like.

The mobile communication device 100 includes a computing platform 102 having a memory 104 and at least one processor 106 in communication with the memory 104. The memory 104 stores activity payment application 108 that is configured to provide automated payment for an activity based on determining location of the activity participant (i.e., user of the mobile communication device). The activity payment application 108 may be specific to one activity site, such as a specific golf course frequented by the participant, or the application 108 may be configured to apply to various different activity sites offering various different activities. The activities sites associated with the activity payment application 108 provide for automated payment of their respective activity based on determining location of the activity participant.

The application 108 is configured to determine that the present location 114 of the mobile communication device, in possession of the participant, is an activity site 112 at which the participant may conduct an activity requiring a payment. Examples of activity sites include, but are not limited to, golf courses, tennis/racquetball facilities, bowling alleys, and the like. It should be evident that the activity sites listed are not intended to be exclusive and that any site at which an activity, requiring payment, can be conducted or performed by a participant is included within the inventive concepts herein disclosed. For example, the participant may be present at a golf course clubhouse where payment for golf course green fees typically occurs.

In specific embodiments of the invention, the application 108 is configured to determine the present location 114 through implementation of a location-determining device 110, such as a Global Positioning System (GPS) device, disposed within the mobile communication device 110 and map the present location 114 to a known activity site 112. In other embodiments of the invention, the application 108 (or the mobile communication device 100 absent the application 108) may be configured to capture computer-readable code, such as a Quick Response (QR) code displayed at the activity site. The computer-readable code, when read by the mobile communication device 108 indicates that the present location 114 of the participant is an activity site 112.

In response to determining that the present location 114 is an activity site, the activity payment application 108 will generate and communicate an activity alert 118 to a user interface 116, such as a display, on the mobile communication device 100. The alert 118 is configured to query the participant as to their desire to participate in the activity offered by the activity site 112 (i.e., present an activity offer 120). The activity offer 120 may include activity pricing and any activity pricing options. In the event that the participant has previously made a reservation for the activity (e.g., a golf course tee time reservation or the like), the alert may include a reservation reminder as opposed to an activity offer 120. In response to the participant agreeing to participate in the activity (or acknowledging the reservation), the alert 118 is further configured to request initial payment 112 from the participant. While the activity offer 120 and request for initial payment 112 are shown and described as occurring within activity alert 118, in practice, separate alerts may be generated and communicated for presenting the activity offer 118 and the initial payment request 122.

It should be noted that the initial payment is less than the full amount due for activity participation. In specific embodiments the initial payment as defined herein may include a minimal down payment or merely authorization to subsequently charge a participant-designated payment account the participant the full amount for activity participation at the conclusion of the activity. For example, if the activity is golfing the initial payment may be for golf cart or a portion of the greens fees, or, if the activity is bowling the initial payment may be for the bowling shoe rental.

Thus, the activity payment application 108 is configured to receive the initial payment authorization 124 that includes the participant-chosen payment account, such as a debit or credit account or the like. The participant may be required to input the payment account information or the application may store the participant's previously configured payment account information. Authorization of the initial payment authorization by the activity site 112 (through the financial institution associated with the participant-designated payment account) results in the participant being granted activity participation authorization 128. The activity participation authorization 128 may be configured as some form of communicated message, such as an alert, a Short Message Service (SMS)/text message, an email or the like and may include a code, such as a bar code or the like, which when read by a gate entry reader or an attendant (e.g., a golf course starter) equipped with a code-reading device, authorizes the participant to enter the activity playing field (i.e., referred to herein as the activity area).

The activity payment application 108 is further configured to determine that the participant has departed 132 the predetermined activity area 130 at which the activity occurs. The predetermined activity area may be the golf course grounds, the premises of the bowling/tennis facility or the like. The predetermined activity area 130 may be a geo-fenced region such that the location-determining device 110 is capable of determining when the participant, in possession of the mobile communication device 100, has departed 132 the activity area 130 (i.e., is no longer located within the geo-fenced region). Since the geo-fenced predetermined activity area is used to indicate that the participant has finished participating in the activity, the geo-fenced predetermined activity area will typically encompass an area greater than the playing field, premises or the like, such as an area including the parking facility or an area exceeding the perimeter of the facility, grounds, premises or the like, by a predetermined distance.

The activity payment application 108 is further configured to, in response to determining that the participant has departed 132 the activity area 130, automatically remit a final payment 134 from the payment account 126 to the activity provider. The final payment, in addition to the initial payment make up the full payment due for the activity. In specific embodiments in which the initial payment is merely authorization to charge the payment account the full payment, the final payment may be the full payment.

The system 10 additionally includes computing device 200 that is in network 300 communication with mobile communication device 100. The computing device 200, which may comprise more than one physical entity, includes computing platform 200 having a memory 204 and a processor 206 in communication with the memory 204. The memory 204 of computing device 200 includes payment authorization routine 208 which is configured to receive initial payment authorization request 124 from the participant via the mobile communication device 100. The initial payment authorization request 124 includes the payment account 126 that the participant has designated for payment of the initial payment and the final payment. In some embodiments of the invention an initial payment is remitted from the payment account while in other embodiments of the invention the initial payment merely serves to authorize automatic remittance of the full payment amount once the participant has finished the activity (i.e., once the participant departed the predetermined activity area). Once the initial payment authorization has been processed, the payment authorization routine will generate and communicate activity participation authorization 128 to the participant via the mobile communication device 100. The activity participation authorization may indicate that the participant has paid the initial payment and/or may include a computer-readable code that allows the participant to gain access to the predetermined activity area. Further, the payment authorization routine is configured to receive authorization to charge the payment account 126 the final payment 134. Such authorization to charge the payment account 126 the final payment 134 is received in response to a determination that the participant has departed the activity area.

Referring to FIG. 2, shown is a more detailed block diagram of the mobile communication device 100, according to embodiments of the present invention. The mobile communication device 100 is configured to provide automated payment for an activity based on determining location of the device. In addition to providing greater detail, FIG. 2 highlights various alternate embodiments of the invention.

The mobile communication device 100 includes computing platform 102 that can receive and execute algorithms, such as routines, and applications. Computing platform 102 includes memory 104, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") (not shown in FIG. 2) that interfaces with any resident programs, such as activity payment application 108 and algorithms associated therewith or the like stored in the memory 104 of the mobile communication device 100.

Processor 106 includes various processing subsystems embodied in hardware, firmware, software, and combinations thereof, that enable the functionality of mobile communication device 100 and the operability of the device on the network 300. For example, processing subsystems allow for initiating and maintaining communications and exchanging data with other networked devices. For the disclosed aspects, processing subsystems of processor 104 may include any subsystem used in conjunction with activity payment application 108 and related algorithms, sub-algorithms, sub-modules thereof.

Computer platform 102 may additionally include communications module (not shown in FIG. 2) embodied in hardware, firmware, software, and combinations thereof, that enables communications among the various components of the mobile communications device 100, as well as between the other networked devices. Thus, communication module may include the requisite hardware, firmware, software and/or combinations thereof for establishing a network communication connection and communicating payment authorization requests to computing device 200.

The memory 104 stores activity payment application 108 configured to provide automated payment for an activity based on determining location of the activity participant. The application 108 is configured to determine that the present location 114 of the mobile communication device, in possession of the participant, is an activity site 112 at which the participant may conduct an activity requiring a payment. Examples of activity sites include, but are not limited to, golf courses, tennis/racquetball facilities, bowling alleys, play facilities, and the like. It should be evident that the activity sites listed are not intended to be exclusive and that any site at which an activity, requiring payment, can be conducted or performed by a participant is included within the inventive concepts herein disclosed.

In specific embodiments of the invention, the application 108 is configured to determine the present location 114 through implementation of a location-determining device 110, such as a Global Positioning System (GPS) device, disposed within the mobile communication device 110 and map the present location 114 to a known activity site 112.

In response to determining that the present location 114 is an activity site, the activity payment application 108 will generate and communicate an activity alert (i.e., first alert) 118 to a user interface 116, such as a display, on the mobile communication device 100. The alert 118 is configured to query the participant as to their desire to participate in the activity offered by the activity site 112 (i.e., present an activity offer 120). The activity offer 120 may include activity pricing and any activity pricing options. In the event that the participant has previously made a reservation for the activity (e.g., a golf course tee time reservation or the like), the alert may include a reservation reminder or confirmation as opposed to an activity offer 120. In response to the participant agreeing to participate in the activity (or acknowledging the reservation), the alert 118 is further configured to request initial payment 112 from the participant. While the activity offer 120 and request for initial payment 112 are shown and described as occurring within activity alert 118, in practice, separate alerts may be generated and communicated for presenting the activity offer 118 and the initial payment request 122.

It should be noted that since the invention requires a final payment once the participant has finished the activity, the initial payment is less than the full amount due for activity participation. In specific embodiments the initial payment as defined herein may include a minimal down payment or merely authorization to subsequently charge a participant-designated payment account the participant the full amount for activity participation at the conclusion of the activity.

Thus, the activity payment application 108 is configured to receive the initial payment authorization 124 that includes the participant-chosen payment account 126, such as a debit or credit account or the like. The participant may be required to input the payment account information or the application may store the participant's previously configured payment account information. Authorization of the initial payment authorization by the activity site 112 (through the financial institution associated with the participant-designated payment account) results in the participant being granted activity participation authorization 128. The activity participation authorization 128 may be configured as some form of communicated message, such as an alert, a Short Message Service (SMS)/text message, an email or the like and may include a code, such as a bar code or the like, which when read by a gate entry reader or an attendant (e.g., a golf course starter) equipped with a code-reading device, authorizes the participant to enter the activity playing field (i.e., referred to herein as the activity area).

In alternate embodiments of the invention, the activity payment application 108 is further configured to generate and communicate second alerts 140 to the user interface 116 of the mobile communication device. The second alert 140 include the current payment amount 142 (i.e., the amount the participant would owe if the activity is completed at this time). Second alerts 140 may be generated at the bequest of the participant or the second alerts may be generated and communicated at specified time or location intervals (e.g., after each hour of activity completion, after every nine holes of golf or the like). Second alerts allow the participant the ability to gauge how much they currently owe and thereby assess if they can afford to continue the activity. As such, activity payment application 108 may be configured to determine the current payment amount 142 based on the arrival time 144 that the participant entered the predetermined geo-fenced activity area 130, the current time 146 and the time rate 148 applicable to the activity (e.g., price per hour or the like). In other embodiments the activity payment application 108 may be configured to determine the current payment amount 142 based on current location 150 of the participant as determined by the mobile communication device 100 and a level-completed rate 152. The current location 150 may indicate the level that the participant is currently participating in or has completed. For example, in a golf-course scenario the current location 150 may indicate that the participate is located on hole No. 9 and if the golf course charges on a per-nine hole basis (i.e., level-completed rate 152), the participant's current payment amount 160 may equal the nine-hole charge.

The activity payment application 108 is further configured to determine that the participant has departed 132 the predetermined activity area 130 at which the activity occurs. The predetermined activity area may be the golf course grounds, the premises of the bowling/tennis facility or the like. The predetermined activity area 130 may be a geo-fenced region such that the location-determining device 110 is capable of determining when the participant, in possession of the mobile communication device 100, has departed 132 the activity area 130 (i.e., is no longer located within the geo-fenced region). Since the geo-fenced predetermined activity area is used to indicate that the participant has finished participating in the activity, the geo-fenced predetermined activity area will typically encompass an area greater than the playing field, premises or the like, such as an area including the parking facility or an area exceeding the perimeter of the facility, grounds, premises or the like, by a predetermined distance.

In alternate embodiments of the invention, the activity payment application 108 is further configured to determine the final payment amount 160 based on the arrival time 144 that the participant entered the predetermined geo-fenced activity area 130, the departure time 162 that the participant departed the predetermined geo-fenced activity area 130 and the time rate 148 applicable to the activity (e.g., price per hour or the like). Such determination of the activity payment amount allows for precise activity charges that can be determined for the actual time (down to the minutes or the like) that the participant participated in the activity as opposed to being charged for full hours or the like when the participant only participated for a portion of the hour in question.

In other embodiments the activity payment application 108 may be configured to determine the final payment amount 160 based on the departure location 164 of the participant as determined by the mobile communication device 100, a level-completed rate 152 and in some embodiments the departure time 162. The departure location 150 may indicate the level that the participant completed. For example, in a golf-course scenario the departure location 150 may indicate that the participate departed proximate hole No. 9 and, based on the departure time would likely have finished nine holes (as opposed to eighteen or more holes). Thus, if the golf course charges on a per-nine hole basis (i.e., level-completed rate 152), the participant final payment amount 160 may be based on the nine-hole charge. Such determination of the activity payment amount allows for activity providers to charge based on how much of the activity the participant has completed. Specifically, in the golf course example, the activity provider can charge on per hole basis and the participant may be able to only be charged for the holes which they actually completed, in the event that complete less than a full round or more than a full round (i.e., 18 holes) or the like.

The activity payment application 108 is further configured to, in response to determining that the participant has departed 132 the activity area 130, automatically remit a final payment 134 from the payment account 126 to the activity provider. The final payment, in addition to the initial payment make up the full payment due for the activity. In specific embodiments in which the initial payment is merely authorization to charge the payment account the full payment, the final payment may be the full payment.

Further, the activity payment application 108 is further configured to, in response to remitting the final payment 134, generate and communicate a payment receipt 170 to the participant. The payment receipt may be communicated to the participant by a participant chosen communication channel including, but not limited to, email, text message, alert or the like. The payment receipt 134 may include the full payment amount 172 including a breakdown of the initial payment and the final payment. In addition, in some embodiments of the invention, the payment receipt may include a computer-readable code that, when read by a computer, indicates that the participant has paid in full. Such computer-readable code may be required to be read by an exit way code-reading device or an attendant in possession of a code-reading device in order for the participant to verify that they have paid in full before leaving the premises of the activity site 112 or the like Referring to FIG. 3 a flow diagram is presented of a method 300 for providing automated payment for an activity based on determining location of the activity participant's mobile communication device, in accordance with specific embodiments of the present invention. At Event 310, the present location of the mobile communication device is determined as an activity site at which the participant may conduct an activity requiring a payment. Examples of activity sites include, but are not limited to, golf courses, tennis/racquetball facilities, bowling alleys, and the like. It should be evident that the activity sites listed are not intended to be exclusive and that any site at which an activity, requiring payment, can be conducted or performed by a participant is included within the inventive concepts herein disclosed.

In specific embodiments of the method, the present location is determined through implementation of a location-determining device, such as a Global Positioning System (GPS) device, disposed within the mobile communication device and mapping the present location to a known activity site. In other embodiments of the invention, the mobile communication device may be configured to capture computer-readable code, such as a Quick Response (QR) code displayed at the activity site. The computer-readable code, when read by the mobile communication device indicates that the present location of the participant is an activity site.

At Event 320, in response to determining that the present location is an activity site, a first alert is generated and communicated to a user interface, such as a display, on the mobile communication device. The alert is configured to query the participant as to their desire to participate in the activity offered at the activity site. In response to the participant agreeing to participate in the activity, the alert is further configured to request the participant submit an initial payment. While the activity offer and request for initial payment are described as occurring within a first alert, in practice, separate alerts may be generated and communicated for presenting the activity offer and the initial payment request.

It should be noted that the initial payment is less than the full amount due for activity participation. In specific embodiments the initial payment as defined herein may include a minimal down payment or merely authorization to subsequently charge a participant-designated payment account the participant the full amount for activity participation at the conclusion of the activity. For example, if the activity is golfing the initial payment may be for golf cart or a portion of the greens fees, or, if the activity is bowling the initial payment may be for the bowling shoe rental.

At Event 330, a participant-input is received that authorizes payment of the initial payment using a participant-designated payment account, such as a debit or credit account or the like. Receipt and authorization of the initial payment authorization by the activity provider (through the financial institution associated with the participant-designated payment account) results in the participant being granted activity participation authorization. The activity participation authorization may be configured as some form of communicated message, such as an alert, a Short Message Service (SMS)/text message, an email or the like and may include a code, such as a bar code or the like, which when read by a gate entry reader or an attendant (e.g., a golf course starter) equipped with a code-reading device, authorizes the participant to enter the activity playing field (i.e., referred to herein as the activity area).

At Event 340 a determination is made that the participant, in possession of the mobile communication device, has departed the predetermined activity area at which the activity occurs. The predetermined activity area may be the golf course grounds, the premises of the bowling/tennis facility or the like. The predetermined activity area may be a geo-fenced region such that the location-determining device is capable of determining when the participant, in possession of the mobile communication device, has departed the activity area (i.e., is no longer located within the geo-fenced region). Since the geo-fenced predetermined activity area is used to indicate that the participant has finished participating in the activity, the geo-fenced predetermined activity area will typically encompass an area greater than the playing field, premises or the like, such as an area including the parking facility or an area exceeding the perimeter of the facility, grounds, premises or the like, by a predetermined distance.

In alternate embodiments of the method (not shown in FIG. 4), in response to determining that the participant has departed from the predetermined activity area, a final payment amount may be determined. In certain embodiments of the method the final payment amount may be determined based on the arrival/entry time of the participant at predetermined activity area, the departure time of the participant from the predetermined activity area and a predetermined time rate charged for the activity (e.g., price per hour or the like). In other embodiments of the method, the final payment amount may be determined based on the departure location of the participant (i.e., precisely where the participant departed the activity area), which may be indicative of how much of the activity (i.e., what level of the activity) the participant completed and a level-completed rate charged for the activity.

At Event 350, in response to determining that the participant has departed the activity area, a final payment is automatically remitted from the payment account 126 to the activity provider, without the participant or the activity provider required to provide any further actions. The final payment, in addition to the initial payment make up the full payment due for the activity. In specific embodiments in which the initial payment is merely authorization to charge the payment account the full payment, the final payment may be the full payment.

In alternate embodiments of the method (not shown in FIG. 3), in response to remitting the final payment, a payment receipt is generated and communicated to the participant. The payment receipt may be configured to include verification that the full payment has been received, the full payment amount (i.e., the final payment in addition to the initial payment) and/or description of the activity.

Referring now to FIG. 4, a block diagram is provided that illustrates the mobile communication device 100 of FIG. 2 in more detail, in accordance with an embodiment of the invention. In some embodiments, the mobile communication device 100 is a mobile phone, but in other embodiments, the mobile communication device 100 can include and/or be embodied as any other mobile communication device described and/or contemplated herein. The mobile communication device 100 includes a processor 106 operatively connected to such devices as memory 104, user interfaces, such as participant output devices 116 and participant input devices 117, communication interface 180, power source 190, clock or other timer 115, a camera/image capture device 113, and a location determining device 110.

The processor 106 may include the functionality to encode and interleave messages and data prior to modulation and transmission. The processor 106 can additionally include an internal data modem. Further, the processor 106 may include functionality to operate one or more software programs, which may be stored in the memory 104. For example, the processor 106 may be capable of operating a connectivity program, such as a web browser application (not shown in FIG. 4). The web browser application may then allow the mobile communication device 100 to transmit and receive web content, such as, for example, location-based content and/or other web page content, according to a Wireless Application Protocol (WAP), Hypertext Transfer Protocol (HTTP), and/or the like.

The processor 106 is configured to use the communication interface 180 to communicate with one or more other devices on the network 300 (not shown in FIG. 5). In this regard, the communication interface 180 includes an antenna 188 operatively coupled to a transmitter 186 and a receiver 184 (collectively referred to as a "transceiver"). The processor 106 is configured to provide signals to and receive signals from the transmitter 186 and receiver 184, respectively. The signals may include signaling information in accordance with the air interface standard of the applicable cellular system of the wireless telephone network. In this regard, the mobile communication device 100 may be configured to operate with one or more air interface standards, communication protocols, modulation types, and access types. By way of illustration, the mobile communication device 100 may be configured to operate in accordance with any of a number of first, second, third, and/or fourth-generation and/or future generation communication protocols and/or the like. For example, the mobile communication device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile communication device 100 may also be configured to operate in accordance with non-cellular communication mechanisms, such as via a wireless local area network (WLAN) or other communication/data networks.

The communication interface 180 may also include a near field communication (NFC) interface 182. As used herein, the phrase "NFC interface" generally refers to hardware and/or software that is configured to contactlessly and/or wirelessly send and/or receive information over relatively short ranges (e.g., within four inches, within three feet, within fifteen feet, or the like). The NFC interface 182 may include a smart card, key card, proximity card, Bluetooth® device, radio frequency identification (RFID) tag and/or reader, transmitter, receiver, and/or the like. In some embodiments, the NFC interface 182 communicates information via radio, infrared (IR), and/or optical transmissions. In some embodiments, the NFC interface 182 is configured to operate as an NFC transmitter and/or as an NFC receiver (e.g., an NFC reader, etc.). In some embodiments, the NFC interface 182 enables the mobile communication device 100 to operate as a mobile wallet. Also, it will be understood that the NFC interface 180 may be embedded, built, carried, and/or otherwise supported in and/or on the mobile communication device 100. In some embodiments, the NFC interface 182 is not supported in and/or on the mobile communication device 100, but the NFC interface 182 is otherwise operatively connected to the mobile communication device 100 (e.g., where the NFC interface 182 is a peripheral device plugged into the mobile communication device 100, or the like). Other apparatuses having NFC interfaces mentioned herein may be configured similarly.

The mobile communication device 100 can have a user interface that is, like other user interfaces described herein, made up of one or more participant output devices 116 and/or participant input devices 117. The participant output devices 116 include a display 116A (e.g., a liquid crystal display (LCD) and/or the like) and a speaker 116B and/or other audio device, which are operatively coupled to the processor 106. The participant input devices 117, which allow the mobile communication device 100 to receive data from a participant, may include any of a number of devices allowing the mobile communication device 100 to receive data from a participant, such as a keypad, keyboard, touch-screen, touchpad, microphone, mouse, joystick, other pointer device, button, soft key, and/or other input device(s). The user interface may also include a camera 113, such as a digital camera, video camera or the like operable to capture computer-readable code and the like.

In some embodiments, the mobile communication device 100 also includes a location determining device 110 that can be used to determine the location of the mobile communication device 100. For example, the location determining device 116 may include a Global Positioning System (GPS) transceiver. In some embodiments, the location determining device 110 is at least partially made up of the antenna 188, transmitter 186, and receiver 184 described above. For example, in one embodiment, triangulation of cellular signals may be used to identify the approximate location of the mobile communication device 100. In other embodiments, the location determining device 110 includes a proximity sensor and/or transmitter, such as an RFID tag, that can sense or be sensed by devices known to be located proximate a merchant and/or other location to determine that the mobile communication device 100 is located proximate these known devices.

The mobile communication device 100 further includes a power source 190, such as a battery, for powering various circuits and other devices that are used to operate the mobile communication device 100. Embodiments of the mobile communication device 100 may also include a clock or other timer 115 configured to determine and, in some cases, communicate actual or relative time to the processor 108 or one or more other devices.

The mobile communication device 100 also includes a memory 104 operatively connected to the processor 106. As used herein, memory includes any computer readable medium (as defined herein) configured to store data, code, and/or other information. The memory 104 may include volatile memory, such as volatile Random Access Memory (RAM) including a cache area for the temporary storage of data. The memory 104 may also include non-volatile memory, which can be embedded and/or may be removable. The non-volatile memory can additionally or alternatively include an electrically erasable programmable read-only memory (EEPROM), flash memory or the like.

The memory 104 can store any of a number of applications which may include computer-executable instructions/code executed by the processor 106 to implement the functions of the mobile communication device 100 described herein. For example, the memory 104 may include such applications as activity payment application 108. It will be understood that the activity payment application 108 can be, individually or collectively, operable (e.g., usable, executable, etc.) to initiate, perform, complete, and/or facilitate any one or more portions of the process flow 300 described herein.

Thus, methods, systems, computer programs and the like have been disclosed that provide for automated initial and final payment for an activity based on determining the location of an activity participant's mobile communication device. The described embodiments provide for the activity participant to automatically pay for the activity based on their presence at the activity location and agreement to participate. As such, the need to check-in and/or pay for the activity at a conventional payment counter is eliminated. Further, the invention provides for an automatic final payment to be made at the conclusion of the activity as opposed to having to pre-pay for the activity prior to conducting the activity. By remitting final payment at the completion of the activity, activity pricing can be accurately determined based on the amount and/or time of the activity in which the activity participant participated.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for a participant to pay for participation in an activity provided by an activity provider, the apparatus comprising:
    a mobile communication device including a computing platform comprising a processor, a memory in communication with the processor and a location-determining device in communication with the processor; and
    an activity payment application stored in the memory, executable by the processor and configured to:
        implement the location-determining device to determine a present location and identify the present location as an activity site at which the participant may conduct an activity requiring payment,
        in response to identifying the present location as the activity site, generate and communicate, to a user interface on the mobile communication device, a first alert that is configured to query the participant to participate in the activity offered at the activity site and, in response to the participant agreeing to participate in the activity, request that the participant submit an initial payment, wherein the initial payment is less than a full payment required for the activity,
        receive a participant-input that authorizes payment of the initial payment using a participant-designated payment account, wherein receipt of the initial payment by the activity provider authorizes the participant to participate in the activity, implement the location-determining device to determine that the participant departed a predetermined area in which the activity occurs, and in response to determining that the participant has departed the predetermined area, automatically remit, from the payment account to the activity provider, a final payment for the activity, wherein the initial payment and the final payment combine to equal a full payment required for the activity.

2. The apparatus of claim 1, wherein the activity payment application is further configured to determine a first time at which the participant initiates the activity and a second time at which the participant finishes the activity, wherein the first and second times are determined based on the participant entering the predetermined area at the first time and departing the predetermined area at the second time.

3. The apparatus of claim 2, wherein the activity payment application is further configured to determine an amount for the final payment, wherein the amount is determined based on the first and second times and a predetermined time-based activity rate.

4. The apparatus of claim 1, wherein the activity payment application is further configured to determine a departure location at which the participant departed the predetermined area, wherein the departure location indicates a level of the activity that the participant completed.

5. The apparatus of claim 4, wherein the activity payment application is further configured to determine an amount for the final payment, wherein the amount is determined based on the level of the activity that the participant completed and a level-completed-based activity rate.

6. The apparatus of claim 1, wherein the activity payment application is further configured to, in response to automatically remitting the final payment, generate and communicate, to the participant, a payment receipt that includes an amount paid for the activity.

7. The apparatus of claim 1, wherein the activity payment application is further configured to implement the location determining device to determine that the participant is located within the predetermined area and, in response to determining that the participant is located within the predetermined area, generate and communicate one or more second alerts, wherein the second alert includes a current payment amount for the activity.

8. The apparatus of claim 7, wherein the activity payment application is further configured to determine the current payment amount based on a first time at which the participant initiated the activity, the current time and a predetermined time-based activity rate.

9. The apparatus of claim 7, wherein the activity payment application is further configured to implement the location-determining device to determine a current location of the mobile communication device, wherein the current location indicates a level of the activity that the participant has currently completed and determine the current payment amount based on the level of the activity that the participant has currently completed and a level-completed-based activity rate.

10. A method for a participant to pay for participation in an activity provided by an activity provider, the method comprising:

determining, by a mobile communication device, a present location as an activity site at which the participant, in possession of the mobile communication device, may conduct an activity requiring payment;

in response to determining the present location as the activity site, generating and communicating, to a user interface on the mobile communication device, a first alert that is configured to query the participant to participate in the activity offered at the activity site and, in response to the participant agreeing to participate in the activity, request that the participant submit an initial payment, wherein the initial payment is less than a full payment required for the activity;

receiving, by the mobile communication device, a participant-input that authorizes payment of the initial payment using a participant-designated payment account, wherein receipt of the initial payment by the activity provider authorizes the participant to participate in the activity;

determining, by a mobile communication device, that the participant, in possession of the mobile communication device, has departed a predetermined area in which the activity occurs; and in response to determining that the participant has departed the predetermined area, automatically remitting, from the payment account to the activity provider, a final payment for the activity, wherein the initial payment and the final payment combine to equal a full payment required for the activity.

11. The method of claim 10, wherein determining that the participant has departed the predetermined area further comprises determining, by a computing device, a first time at which the participant initiates the activity and a second time at which the participant finishes the activity, wherein the first and second times are determined based on the participant, in possession of the mobile communication device, entering the predetermined area at the first time and departing the predetermined area at the second time.

12. The method of claim 11, further comprising determining, by a computing device, an amount for the final payment, wherein the amount is determined based on the first and second times and a predetermined time-based activity rate.

13. The method of claim 10, wherein determining that the participant has departed the predetermined area further comprises determining, by a computing device, a departure location at which the participant departed the predetermined area, wherein the departure location indicates a level of the activity that the participant completed.

14. The method of claim 13, further comprising determining an amount for the final payment, wherein the amount is determined based on the level of the activity that the participant completed and a level-completed-based activity rate.

15. The method of claim 10, further comprising, in response to automatically remitting the final payment, generating and communicating, to the participant, a payment receipt that includes an amount paid for the activity.

16. The method of claim 10, further comprising generating and communicating, to the mobile communication device, one or more second alerts while the participant, in possession of the mobile communication device, is located within the predetermined area, wherein the second alert includes a current payment amount for the activity.

17. The method of claim 16, further comprising determining, by a computing device, the current payment amount based on a first time at which the participant initiated the activity, the current time and predetermined time-based activity rate.

18. The method of claim 16, further comprising determining, by a computing device, the current payment amount based on a current location of the participant, in possession of the mobile communication device, and a level-completedbased activity rate, wherein the current location indicates the level of the activity that the participant has currently completed.

19. A computer program product, the computer program product comprising a non-transitory computer-readable medium having computer-executable instructions to cause a computer to implement the steps of:

determining a present location as an activity site at which a participant may conduct an activity requiring payment;

in response to determining the present location as the activity site, generating and communicating a first alert that is configured to query the participant to participate in the activity offered at the activity site and, in response to the participant agreeing to participate in the activity, request that the participant submit an initial payment, wherein the initial payment is less than a full payment required for the activity;

receiving a participant-input that authorizes payment of the initial payment using a participant-designated payment account, wherein receipt of the initial payment by an activity provider authorizes the participant to participate in the activity;

determining that the participant has departed a predetermined area in which the activity occurs; and in response to determining that the participant has departed the predetermined area, automatically remitting a final payment for the activity, wherein the initial payment and the final payment combine to equal a full payment required for the activity.

20. The computer program product of claim 19, wherein the step of determining that the participant has departed the predetermined area further comprises determining a first time at which the participant initiates the activity and a second time at which the participant finishes the activity, wherein the first and second times are determined based on the participant, in possession of the mobile communication device, entering the predetermined area at the first time and departing the predetermined area at the second time.

21. The computer program product of claim 20, wherein the steps further comprise determining an amount for the final payment, wherein the amount is determined based on the first and second times and a predetermined time-based activity rate.

22. The computer program product of claim 19, wherein the step of determining that the participant has departed the predetermined area further comprises determining a departure location at which the participant departed the predetermined area, wherein the departure location indicates the level of the activity that the participant completed.

23. The computer program product of claim 19, wherein the steps further comprise determining an amount for the final payment, wherein the amount is determined based on the departure location and a level-completed-based activity rate.

24. The computer program product of claim 19, wherein the steps further comprise, in response to automatically remitting the final payment, generating and communicating, to the participant, a payment receipt that includes an amount paid for the activity.

25. The computer program product of claim 19, wherein the steps further comprise generating and communicating, to the mobile communication device, one or more second alerts while the participant, in possession of the mobile communication device, is located within the predetermined area, wherein the second alert includes a current payment amount for the activity.

* * * * *